United States Patent [19]

Keefe et al.

[11] 3,914,751

[45] Oct. 21, 1975

[54] GAPLESS MULTITHICKNESS PROPAGATION STRUCTURE FOR MAGNETIC DOMAIN DEVICES

[75] Inventors: George E. Keefe, Montrose; Yeong S. Lin, Mount Kisco, both of N.Y.; Laurence L. Rosier, San Jose, Calif.

[73] Assignee: International Business Machines, Corporation, Armonk, N.Y.

[22] Filed: Dec. 27, 1973

[21] Appl. No.: 429,001

[52] U.S. Cl. .................. 340/174 TF; 340/174 EB; 340/174 VA; 340/174 ZB

[51] Int. Cl.[2] .......................................... G11C 11/14

[58] Field of Search ............................... 340/174 TF

[56] References Cited

UNITED STATES PATENTS 3,523,286 8/1970 Bobeck et al. ................ 340/174 TF

*Primary Examiner*—James W. Moffitt

*Attorney, Agent, or Firm*—Sughrue, Rothwell, Mion, Zinn & Macpeak

[57] ABSTRACT

A gapless, multithickness propagation structure is provided for implementing the continuous movement of magnetic bubble domains under the control of a reorienting in-plane field. Propagation is achieved by providing two parallel rows of H-shaped overlays of soft magnetic material in spaced-apart end-to-end relation adjacent to one surface of a magnetic medium having magnetic bubble domains therein. The ends of the H-shaped overlays in each row are connected to each other and the ends of the H-shaped overlays in the adjacent row by means of a transversely extending overlay strip having a thickness approximately one-half the thickness of the H-shaped overlays. High storage density, with a cell size $8W^2$ is obtained, where W is the line width of the elements in the structure.

20 Claims, 5 Drawing Figures

GAPLESS MULTITHICKNESS PROPAGATION STRUCTURE FOR MAGNETIC DOMAIN DEVICES

BACKGROUND OF THE INVENTION

1. Field of the Invention

The present invention relates to magnetic bubble domain devices and more particularly, to gapless multithickness structures for implementing the controlled, high density movement of magnetic bubble domains in a supporting medium.

2. Prior Art

In the new and rapidly developing field of technology relating to magnetic bubble domains, the preferred means for implementing the controlled movement of bubbles within a magnetic medium such as a platelet or layer of orthoferrite or garnet, or other suitable material, has involved the use of overlay strips of permalloy or the like. These strips are magnetically soft, are adjacent to the medium and serve to channel and concentrate the flux from a rotating in-plane magnetic field. This concentration produces poles at the ends of the strips when they are aligned with the rotating field and these poles attract or repel the bubbles depending on the polarity thereof to control their movement.

The permalloy structures currently in use include the T-I bar, Y-I bar, Y—Y bar and chevron patterns which rely on gaps between the bars to provide a continuous flow of bubbles around the structures in the presence of a rotating or pulse-sequenced magnetic field.

The gapped permalloy patterns are characterized by a number of major disadvantages. For one, the bubble diameter must be substantially larger (typically two times larger) than the gap width in order to traverse it. This reduces the density of storage which can be achieved for a given line width because unwanted magnetic interaction between bubbles requires that bubbles be separated by distances greater than $k$D, where D is the bubble diameter and $k$ is a device sensitive parameter, typically about 4. In addition, the propagation of a bubble domain across a gap renders it momentarily less stable and thus, more likely to collapse, split, or otherwise behave in an erratic manner, thus reducing device operating margins. Finally, the close dimensional tolerances that must be maintained at the gaps, makes the fabrication of the permalloy overlays more difficult and increases the likelihood or serious propagation errors occurring at the gaps.

Several propagation structures which are generally of a gapless form have been proposed in the prior art as typified by U.S. Pat. Nos. 3,516,077 (Tangent Discs on Alternately Opposite Sides of a Platelet), 3,518,643 (Zig-Zag Strip), and 3,644,908 (Sinuous Magnetically Hard Strip Alongside a Straight Strip). All of these structures have a number of disadvantages such as low packing density and the ability to implement bubble movement in only a single direction. Furthermore, although U.S. Pat. No. 3,516,077 teaches the use of spaced discs having varying thicknesses to permit the transfer of bubble domains from one disc to the next without the use of a permalloy guide rail, the discs on each surface of the platelet are spaced from each other and accordingly, suffer from the above-mentioned disadvantages of gapped structures. As a result, it is impossible to significantly reduce the cell size to increase storage density so that the structure in effect, is merely an alternative of the conventional gapped structures.

Accordingly, it is a primary object of the present invention to provide high density structures for bubble domain propagation and storage.

It is another object of this invention to provide high density, single-sided structures for magnetic bubble domain propagation and storage.

It is a further object of this invention to provide high density, gapless structures for magnetic bubble domains which have good operating margins.

It is a still further object of this invention to provide improved gapless structures for bubble domain manipulation.

SUMMARY OF THE INVENTION

The present invention obviates the above-noted disadvantages attendant with the prior art constructions by providing a gapless, single-sided, multithickness propagation structure of permalloy or the like, which enables the continuous movement of magnetic bubbles along a straight line path in response to an in-plane rotating or pulse-sequenced magnetic field.

The present invention provides a propagation structure which is capable of improving the stepwise density of magnetic bubbles since there are no gaps between contiguous magnetic material overlays.

To accomplish the foregoing objects of the present invention, a gapless, single-sided, multithickness propagation structure is provided by using two parallel rows of H-shaped structures adjacent to the surface of a magnetic bubble domain medium with the spaced-apart ends of the H-shaped structures being connected to each other and to the ends of the H-shaped structures in the adjacent row by means of transverse strips of magnetic overlay having a thickness approximately one-half the thickness of the H-shaped structures. Upon rotation of an in-plane magnetic field, the relatively thin connecting strips and the bars of the H-shaped structure will be sequentially polarized to advance the bubbles within the magnetic bubble domain medium along a predetermined path. Since the bars of the H-shaped structure are thicker than the interconnecting strips, the pole strength of the vertical bars of the H-shaped structure will be greater than the pole strength of the interconnecting strips, thereby aiding in the controlled movement of a magnetic bubble domain along a predetermined path. In this manner, the operating margin of this structure is increased.

Propagation structures other than soft magnetic materials can be used such as ion implanted or diffused regions in the magnetic material or physically removed areas of magnetic material such as grooves. To achieve different thickness effects using ion implantation or diffusion, the bubble domain material is subjected to different depths of diffusion or ion implantation. For instance, impurities can be put into the bubble domain material to first and second depths in different portions of the material. If physical removal of portions of the bubble domain material is used, etching to different depths will achieve the necessary thickness variations.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
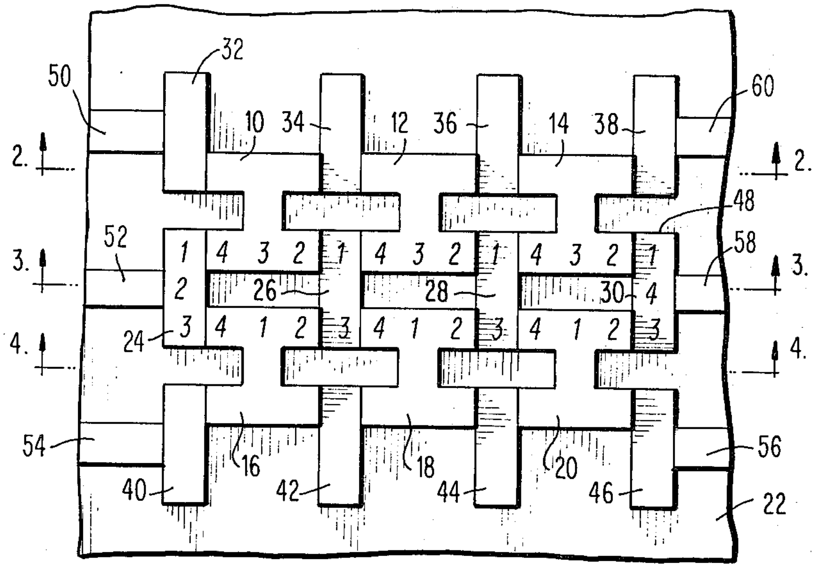
FIG. 1 is a partial top plan view of a gapless single-sided, multithickness propagation structure in accordance with the present invention.
Figure 2:
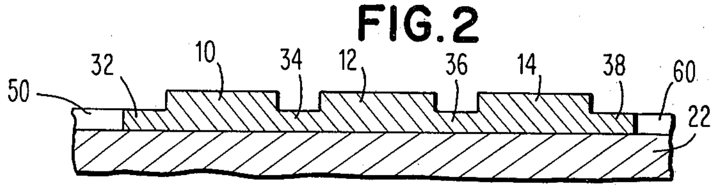
FIG. 2 is a sectional view taken along the line 2—2 of FIG. 1.
Figure 3:
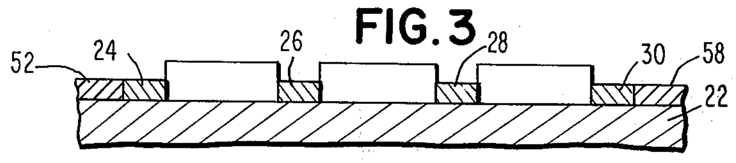
FIG. 3 is a sectional view taken along the line 3—3 of FIG. 1.
Figure 4:
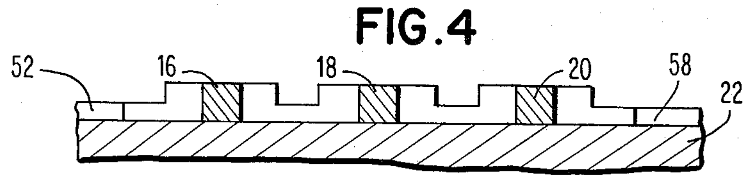
FIG. 4 is a sectional view taken along the line 4—4 of FIG. 1.

Referring to the drawings, FIG. 1 shows three H-shaped propagation structures 10, 12 and 14 (rotated 90° with respect to a horizontal line) disposed in a horizontal row in spaced-apart end-to-end relation. A second row of H-shaped propagation structures 16, 18 and 20 are also disposed in spaced-apart end-to-end relation parallel to the first row of H-shaped propagation structures. These propagation structures may be of permalloy or other magnetically soft material adjacent to the upper surface of a magnetic medium 22 of orthoferrite, garnet or other suitable material. The adjacent ends of the H-shaped structures in one row are connected to each other and to the adjacent ends of the H-shaped structures in the other row by means of transversely extending rectilinear bars or I-bars 24, 26, 28 and 30. These I-bars are approximately one-half the thickness of the H-shaped structure. For example, the thickness of the H-shaped structures may be approximately 2,000A. Additional I-bars 32-46 may be provided to connect the other legs of the H-shaped structures in each row to adjacent rows of H-shaped structures not shown. The number of rows of H-shaped structures and the length of each row of H-shaped structures may be of any desired number.

In the present application only a single closed path or loop is described in detail by way of example. Therefore, for purposes of description only a T-bar portion of each H-shaped structure will be considered and the same reference numerals 10, 12, 14, 16, 18 and 20 which designate the H-shaped structures can be considered as designating the T-bar structures for the single loop under consideration. The only reason an H-shaped structure is illustrated is to show the capability of forming additional adjacent loops.

Figure 5:
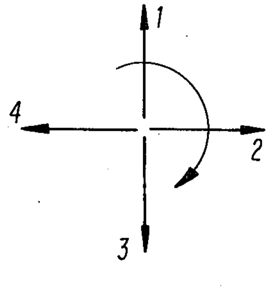
FIG. 5 shows a rotating magnetic field vector for propagating magnetic bubble domains in the pattern shown in FIG. 1 relative to the propagation structure on the upper surface of the magnetic medium.

For the purpose of description and understanding, it will be assumed that the plane of the drawing paper represents the upper surface of a bubble domain material and that a magnetic field of sufficient magnitude to support bubble domains, extends perpendicularly to the surface of the paper so that the uppermost ends of the cylindrical bubbles (not shown) which are disposed in the plane of the paper will have a negative polarity. The permalloy propagation construction may be on the surface of the bubble domain material or may be slightly spaced therefrom by an insulating layer. For convenience, the numerals 1–4 have been placed at various points along the propagation structure of FIG. 1 to indicate the presence of a positive pole when the propagation field vector of FIG. 5 is rotated in a clockwise direction for sequential disposition at similarly numbered rotational phase positions. A plurality of bubbles may be moved simultaneously by the attractive positive poles along the continuous path 1, 2, 3, 4, 1, 2 . . . , indicated in FIG. 1 but for the purpose of the present discussion, only the movement of a single representative bubble will be discussed in detail. Assuming the starting point of the bubble to be at the end 48 of the I-bar 30, with the propagation field vector disposed in position 1 in FIG. 5, a positive pole will be disposed at the end 48 of I-bar 30 as indicated by the numeral 1, thereby holding the bubble at this position. As the propagation field vector rotates to position 2, the right hand end of the cross bar of the T-bar structure 14 as viewed in FIG. 1, will become positive and since the T-bar structure 14 is twice as thick as the strip 30, a strong positive pole will cause the bubble to shift from position 1 to position 2. As the propagation field vector rotates to position 3 in FIG. 5, the stem of the T-bar structure 14 will be magnetized with a positive polarity at 3, causing the shift of the bubble from position 2 to position 3. Likewise, the rotation of the propagation field vector to position 4 in FIG. 5 will create a positive pole at position 4, thereby transferring the bubble from position 3 to position 4. As the propagation field vector returns to position 1, the I-bar 28 will become magnetized with a positive pole located at 1. This will cause the domain to move to pole position 1 on I-bar 28. Upon further rotation of the propagation field vector to position 2, a positive pole will be located at position 2 on the T-bar structure 12 and a negative pole will be located at position 4 on the T-bar structure 14, thus causing the transfer of the magnetic bubble to position 2 on the T-bar structure 12.

The bubble will continue to move in the straight line to the left as viewed in FIG. 1, until it reaches position 1 on the end I-bar 24. To aid in turning corners, I-bars 50, 52, 54, 56, 58 and 60 are provided. For instance, I-bar 52 is adjacent to I-bar 24 forming a T-bar structure and serves to create a positive pole 2 in the center of I-bar 24 when the field vector is in direction 2. This aids the movement of the bubbles around the corner of the propagation path. As the field vector moves to position 3, the opposite end of the I-bar 24 will be provided with a positive pole 3 shifting the magnetic bubble from position 2 to position 3 on the I-bar 24. Continued rotation of the field vector will move the bubble in a straight line to the right, and finally to position 3 on strip 30. Element 58 is adjacent to I-bar 30 forming a T-bar structure and serves to aid bubble domain propagation along I-bar 30. That is, a positive pole 4 is created in I-bar 30 when the propagation field is in direction 4. Continued rotation of the field vector will then transfer the bubble to position 1 on I-bar 30 for another cycle of operation along this same closed path as indicated. The reversal of the field vector rotation from a clockwise rotation as indicated in FIG. 5, to a counter clockwise rotation, would cause reversal of the direction of bubble movement along the indicated path in FIG. 1.

The I-bars 50, 52, . . . , 60 are about the same thickness (or of equal thickness) as the strips 24, 26, . . . , 46, and could be made integral with the strips which they contact. For instance, a single deposition step (masking) could be used to form a sideways T-bar member comprised of a cross bar 30 and a perpendicularly disposed bar 52.

The practical utilization of the propagation structure disclosed herein could be accomplished in the usual manner with the presence of a bubble representing a logical "one" and the absence of a bubble representing a logical "zero." Sensing could be implemented by a magnetoresistive sensor or by other well-known means. The loops as described above could be employed as minor recirculating loops in a mass memory with control lines provided to generate field gradients of sufficient strength to pull selected bubbles from the minor loops to an interconnecting major loop and vice versa.

This propagation structure can also be thought of as a gapless T-I bar structure where the cross bars of the H-shaped elements are common legs of oppositely facing T-bars. The I-bar elements would then be the vertically disposed strips 24, 26, 28, 30, 32, . . . , 46. However, a gapless T and I bar structure will not have good operating margins due to weak poles formed at the locations where adjacent T-bars along any row are to be joined to the I-bars located between them. In order to improve the operating margin, the thickness of the I bars is conveniently made different than the thickness of the T-bars.

When ion implantation or diffusion is used to make this propagation structure, the magnetic bubble domain material is affected to different depths for the H-shaped elements than for the vertical strips 24, 26, . . . , 46. Correspondingly, when the thickness of the magnetic material 22 is to be locally altered to provide this propagation structure, the depth of etching for the H-shaped elements is different than the depth for the vertical strips 24, 26, . . . , 46.

What has been described is a one-sided, gapless propagation structure which can be used to manipulate magnetic bubble domains. The structure can be used to store these magnetic domains with a high storage density, the unit cell of this storage means having an area (2W)(4W), where W is the minimum line width of the elements in the cells and the nominal bubble domain diameter is W/2.

In order to provide good operating margins in this gapless structure, different straight line portions of it have different thicknesses (or depths) in order to enhance the attractive poles formed along it. Although a thickness (depth) variation of 2:1 is conveniently chosen, it should be understood that other ratios could be used, depending on the desired data rate, etc.

While the invention has been particularly shown and disclosed with reference to a preferred embodiment thereof, it will be understood by those in the art, that various changes in form and details may be made therein without departing from the spirit and scope of the invention.

What is claimed is:

1. A gapless, single-sided propagation structure for implementing the continuous movement of magnetic bubble domains in a supporting material in response to a reorienting in-plane magnetic field comprising a plurality of propagation structures of magnetically soft material having at least a T-bar configuration with the cross bars of said T-bar configuration being disposed in spaced-apart aligned relation and a plurality of I-bars of magnetically soft material having one end thereof disposed intermediate and connecting said cross bars with the opposite end thereof extending in the opposite direction from the stem of said T-bar structures, said T-bar structures having a thickness approximately twice as great as the thickness of said I-bars.

2. A gapless propagation structure as set forth in claim 1 further comprising a second plurality of propagation structures of magnetically soft material having at least a T-bar configuration with the cross bars of said T-bar structures being disposed in spaced-apart aligned relation parallel to the cross bars of the first mentioned plurality of structures with the stems thereof extending in the opposite direction from the stems of the first plurality of T-bar structures and with the opposite ends of said I-bars disposed between and connected to the cross bars of the second plurality of structures and two additional T-bars of magnetically soft material having the cross bars thereof disposed parallel to said first mentioned I bars and interconnecting the ends of each plurality of structures to define a closed loop path for the continuous movement of magnetic bubble domains said two additional T-bars being of equal thickness with said I-bars and having the stems extending outwardly of said loop.

3. A structure for moving magnetic bubble domains in a supporting medium, comprising:
- a magnetic medium in which said bubble domains can move,
- a propagation structure for moving said domains in said magnetic medium, said propagation structure being comprised of a plurality of adjacent elements which are in contact with one another, said elements being comprised of rectilinear bar segments having different thicknesses capable of providing magnetic poles for shifting said domains in response to an in-plane magnetic field having ranging orientation.

4. The structure of claim 3, where said elements are comprised of T-bars and I-bars located between adjacent T-bars and in contact therewith, said I-bars having a different thickness than said T-bars.

5. The structure of claim 3, where said elements are comprised of a plurality of first H-shaped elements each of which has two side members connected by a crossbar and being disposed with the side members of adjacent H-shaped elements in alignment with one another, there being a plurality of I-bars between adjacent ones of said H-shaped elements and in contact therewith, said I-bars having different thicknesses than said adjacent H-shaped elements.

6. A structure for moving magnetic bubble domains in a supporting medium comprising:
- a magnetic medium capable of supporting said domains,
- a propagation structure for moving said domains in said supporting medium, said propagation structure being comprised of at least one rectilinear bar element in contact with another bar element having a different thickness than said first bar element, there being magnetic poles created along said bar elements in response to the application of a reorienting magnetic field in rectilinear said magnetic medium.

7. The structure of claim 6, where said at least one bar element is a T-bar.

8. A gapless single sided propagation structure for implementing the continuous movement of magnetic bubble domains in a supporting material in response to a reorienting in-plane magnetic field, comprising a plurality of T-bar propagation structures with the cross bars of said T-bars being disposed and spaced apart in aligned relationship, and
- a plurality of I-bars having one end thereof disposed intermediate and connecting the crossbars of adjacent T-bars, with the opposite ends thereof extending in the opposite direction from the stem of said T-bars, said T-bars having a different thickness than the thickness of said I-bars.

9. The structure of claim 8, where said T-bars and said I-bars form a closed loop propagation structure.

10. The structure of claim 8, where said bar elements are comprised of a magnetically soft material.

11. The structure of claim 8, where said bar elements are comprised of modified regions of said supporting material.

12. A structure for moving magnetic bubble domains, comprising:

a magnetic medium in which said bubble domains can be moved, a gapless, one-sided structure adjacent to said magnetic medium, said structure being comprised of repetitive patterns of rectilinear bar elements along with magnetic poles are established in response to the application of a reorienting magnetic field in the plane of said medium, where said structure has a unit cell size having an area $8W^2$, wherein W is the minimum line width of said elements.

13. The structure of claim 12, where said bar elements are comprised of magnetically soft material.

14. The structure of claim 12, where said bar elements are defined by different regions of said magnetic medium.

15. The structure of claim 12, where said patterns are located with respect to one another to define a closed loop propagation path for said domains.

16. The structure of claim 12, where said structure is comprised of means for increasing the stength of said magnetic poles at selected locations along said gapless, one-sided structure.

17. The structure of claim 12, where different bar elements in each said pattern have different thicknesses.

18. The structure of claim 17, where some of said bar elements are T-bars.

19. The structure of claim 17, where the ratio of thicknesses of said different bar elements is approximately 2:1.

20. In a structure comprising a magnetic medium capable of supporting magnetic bubble domains and a propagation structure for defining the path by which said domains propagate within said magnetic medium in response to different in-plane magnetic fields applied to said medium, said propagation structure comprising:

a plurality of contiguous elements each having a rectilinear bar segment of a thickness different from that of an adjacent element.

* * * * *

UNITED STATES PATENT AND TRADEMARK OFFICE

CERTIFICATE OF CORRECTION

PATENT NO. : 3,914,751

DATED : October 21, 1975

INVENTOR(S) : George E. Keefe et al

It is certified that error appears in the above-identified patent and that said Letters Patent are hereby corrected as shown below:

IN THE SPECIFICATION:

Column 1, line 47 -- Delete "or" and insert -- of --

Column 4, line 36 -- After "ture" insert a comma (,)

IN THE CLAIMS:

Column 6, line 11 -- Delete "I bars" and insert -- I-bars --
line 51 -- before "bar" insert -- rectilinear --
line 55 -- Delete "rectilinear" and insert -- the plane of --

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,914,751

DATED : October 21, 1975

INVENTOR(S) : George E. Keefe et al

It is certified that error appears in the above-identified patent and that said Letters Patent are hereby corrected as shown below:

IN THE SPECIFICATION:

Column 4

Line 12, delete "strip" and insert --I-bar--

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*